March 26, 1946.  R. M. WICK  2,397,177
APPARATUS FOR ELECTROPLATING BALL BEARINGS
Filed Aug. 1, 1940  2 Sheets-Sheet 1
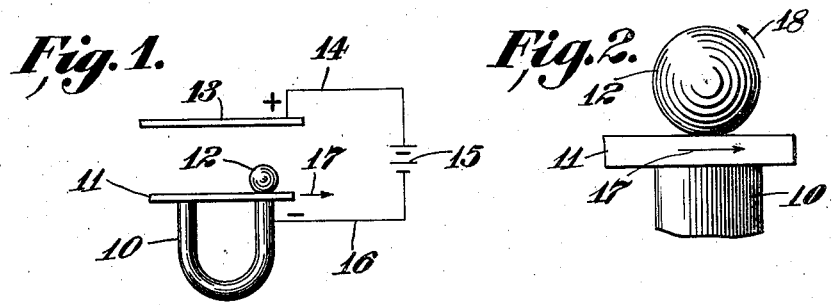
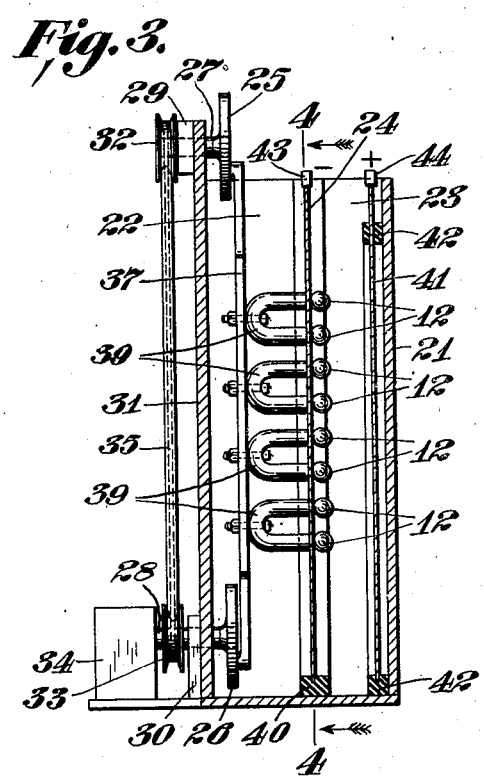
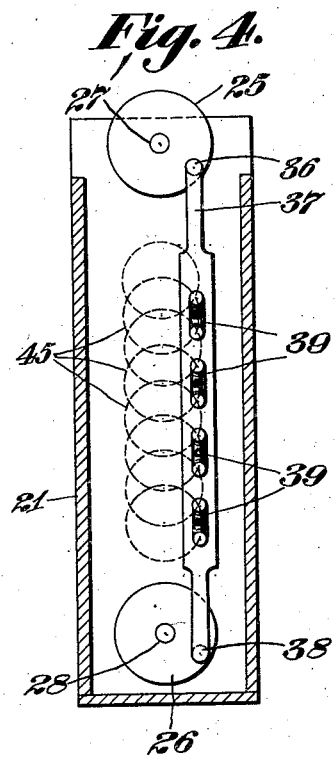
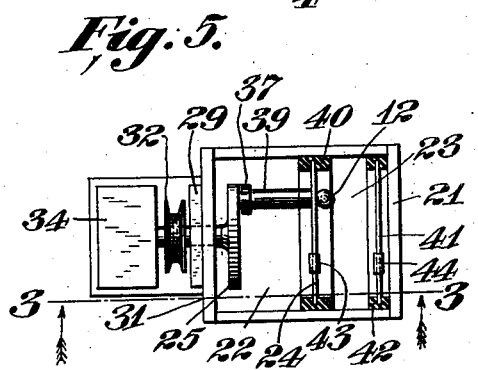
Inventor
*Richard M. Wick.*
By *R. S. C. Dougherty.*
Attorney March 26, 1946.  R. M. WICK  2,397,177
APPARATUS FOR ELECTROPLATING BALL BEARINGS
Filed Aug. 1, 1940  2 Sheets-Sheet 2
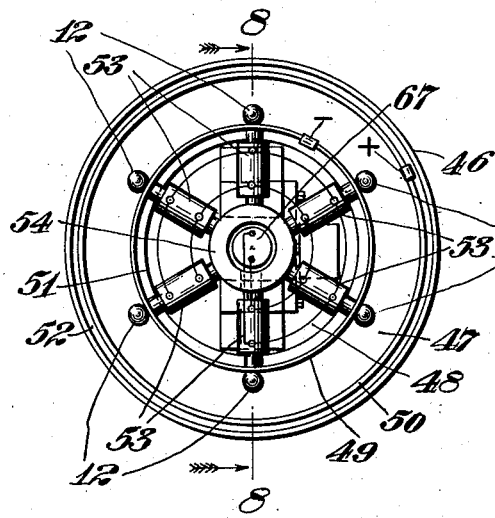
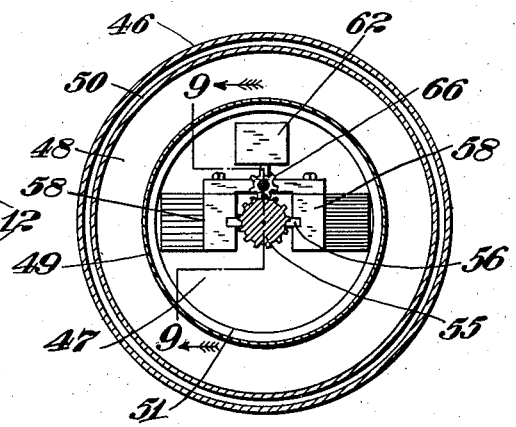
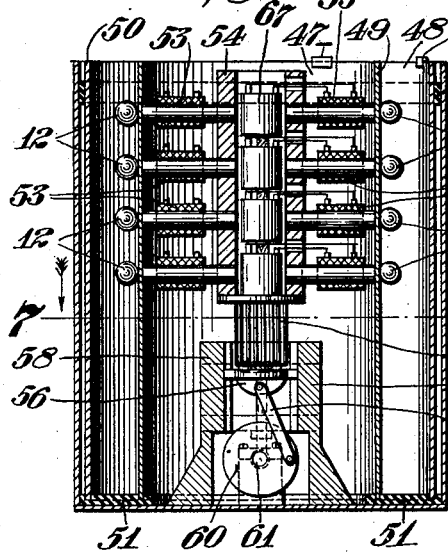
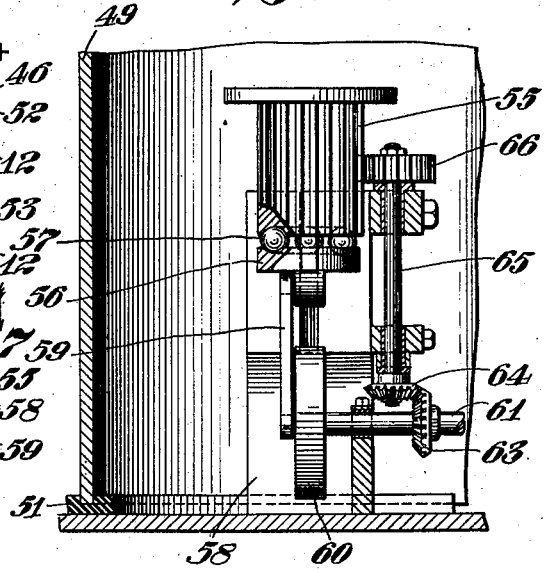
Inventor
Richard M. Wick.
By R. S. C. Dougherty.
Attorney Patented Mar. 26, 1946

2,397,177

UNITED STATES PATENT OFFICE 2,397,177

APPARATUS FOR ELECTROPLATING BALL BEARINGS

Richard M. Wick, Allentown, Pa.

Application August 1, 1940, Serial No. 349,361

5 Claims. (Cl. 204—169)

(Granted under the act of March 3, 1883, as amended April 30, 1928; 370 O. G. 757)

My invention relates to an improved ball bearing of ferrous material which is electroplated with a non-ferrous metal such as chromium. A ball bearing of this type possesses decided advantages for aircraft instruments which operate at high speeds. Ordinarily ferrous ball bearings when operated at high speeds have a tendency to gall. With an electroplated coating of a metal such as chromium the coefficient of friction will be lowered and there is a greater stability of the surface due to a higher resistance to corrosion, thus eliminating the galling of the ball bearing.

Electroplating of ball bearings or any sphere with a uniform coating has been hampered by many difficulties. Due to its spherical surface the usual type of electroplating apparatus will not be suitable since holders and contacts of the usual type have obvious effects on the uniformity of the coating. All these difficulties are removed by my invention as will be seen in the following description.

My invention comprises supporting ferrous ball bearings on a non-magnetic conducting surface by magnetic means within an electroplating tank such that the ball bearings are cathodic within the tank, causing relative movement between the conducting surface and the magnetic means so that the balls are rotated on the conducting surface, and exposing the ball to electrolytic treatment whereby the surface of the ball bearings are uniformly electroplated. My invention also includes as an article of manufacture a ball bearing with an electroplated coating of uniform thickness.

If a thin sheet of non-magnetic conducting material such as copper is interposed between a pole-face of a magnet and a ferrous ball bearing, relative movement of the magnet and the conducting piece will cause rotation of the ball bearing on the conducting sheet. Thus if the ball bearing, the conducting sheet, and the magnet are so placed with respect to an electroplating bath that the conducting sheet serves as a cathode contacting means and the ball bearing forms the cathode, rolling movement of the ball bearing on the conducting piece will expose all of its surface equally to electroplating action and the ball bearing will be uniformly electroplated.

A more complete understanding of my invention will be obtained from consideration of the accompanying drawings which form a part of the specification.

Figure 1 is a diagrammatic representation of the basic apparatus;

Figure 2 is an enlarged view of the bearing of Figure 1 wherein the principle of rotation of the ball bearing is illustrated;

Figure 3 is an elevated section of one mode of practicing my invention taken on line 3—3 of Figure 5;

Figure 4 is an elevated section taken on the line 4—4 of Figure 3;

Figure 5 is a plan view of Figure 3;

Figure 6 is a plan view of another mode of practicing my invention;

Figure 7 is a horizontal section taken on the line 7—7 of Figure 8;

Figure 8 is an elevated section taken on the line 8—8 of Figure 6; and

Figure 9 is a sectional view taken on line 9—9 of Figure 7.

In Figure 1 is shown a permanent magnet 10 of the conventional U-shape type upon the pole-faces of which rests a thin strip 11 of non-ferrous metal such as copper. The strip may be of any desired length and wide enough to cover the pole-faces. Over one of the pole-faces a ball bearing 12 of ferrous metal is placed. On the opposite side of the ball 12 from the conducting strip 11 is an anode 13. This apparatus is inserted in a suitable electrolyte and a positive conductor 14 is connected to the anode 13 from the battery 15 or any suitable source of direct current, and a negative conductor 16 is connected to the magnet 10 from the battery 15. Thus the ball bearing will become the cathode.

During plating the conducting non-magnetic strip 11 is moved slowly in the direction of arrow 17 causing the ball to rotate as indicated by arrow 18 in Figure 2. The magnetic attraction between the magnet and the ball bearing will tend to resist increase of the air-gap formed by the conducting non-magnetic strip when the strip is moved. This resistance to the increase of the air-gap will hold the ball practically in its initial position and consequently the movement of the strip will cause rotation of the ball bearing through frictional engagement between the ball bearing and the strip. It is of course understood that this particular direction of motion of the ball bearing is merely used as illustrative and not by way of limitation, that is, the direction may be irregular or changed and, furthermore, the direction of motion may be reversed or the motion changed intermittently without varying from the spirit of my invention.

In Figures 3, 4, and 5 showing one type of apparatus for practicing my invention, rectangular tank 21 is divided into chambers 22 and 23 by partition 24. In chamber 22 are two wheels 25 and 26 which are rotated by shafts 27 and 28 in bearing blocks 29 and 30. Bearing blocks 29 and 30 are mounted on wall 31 of chamber 22. On shafts 27 and 28 are pulley wheels 32 and 33, respectively. Shaft 28 extends into the speed reducer and motor unit 34. Motor and speed reduction unit 34 drives wheel 26 and at the same time drives wheel 25 by means of belt 35 on pulleys 32 and 33 in synchronism with wheel 26.

On wheel 25 at a point 36 eccentric to the center of wheel 25 is pivoted one end of a vertical bar 37. The other end of bar 37 is pivoted at eccentric point 38 on wheel 26 such that the distance between the two eccentric points 36 and 38 is equal to the length of the centerline drawn between the center of the two wheels 25 and 26 and the two angles formed by the lines drawn from the centers of wheels 25 and 26 to their corresponding eccentric points with said centerline are always equal.

On the vertical bar 37 are bolted any number of permanent magnets 39, in this case, four. These magnets are placed so that their pole-faces are adjacent the partition 24. This partition 24 is preferably made of any non-magnetic conducting metal such as copper.

Chamber 23 is used as the electroplating tank and the walls, other than partition 24, and the bottom are covered with suitable material to resist any corrosive action of the electrolyte that may be used. Incidentally, partition 24 will receive a coating of metal but this will not interfere with its function. Partition 24 is set in insulating and liquid sealing material shown at 40 so that the partition can be used both as the cathode contactor means and as one wall of the electrolytic tank. Opposite partition 24 is anode 41 of any material suitable for the type of electro-plating to be used. This is likewise insulated from the tank by blocks 42 which also serve to hold it in place. The direct current for electroplating can be introduced by means of negative terminal 43 and positive terminal 44 from any suitable source.

To electroplate ball bearings of ferrous metal, a ball bearing 12 is placed adjacent each pole-face of a magnet on the vertical surface of the partition 24 in the electroplating chamber 23. The balls 12 are held in place by magnetic attraction. The motor of unit 34 is started and the electroplating chamber filled with suitable electrolyte. With the current supply turned on, the electroplating is started.

The action of the apparatus is that the eccentric points 36 and 38 will be rotated about the centers of wheel 25 and 26, respectively, causing the pole-faces of the magnets 39 to describe circular paths 45, as shown in Figure 4, on the vertical surface of partition 24 in chamber 22. The ball bearings pulled by magnetic force will describe identical circular loci on the opposite face of partition 24 in the electrolyte. As a result, the ball bearings will be rolled on the surface of partition 24 exposing all parts of their surfaces equally to the electrolytic action and they will receive a uniform coating.

The speed reducer in unit 34 permits the wheels 25 and 26 to revolve very slowly so that the balls are rolled very slowly on the cathode contactor 24.

As another illustration of the type of apparatus that can be used is that shown in Figures 6, 7, 8, and 9. This comprises a cylindrical tank 46 which is divided into two chambers 47 and 48 by the annular separator 49. This forms an inner cylindrical chamber 47 and an outer annular chamber 48. The outer chamber serves as the electroplating cell wherein a cylindrical anode 50 is placed adjacent the wall of tank 46 and insulated therefrom by insulating rings 51 and 52. Insulating ring 52 also serves as the insulation for the separator 49 which is the cathode contactor surface.

In the inner chamber 47 are a number of bar electro-magnets 53 mounted on a hollow cylinder 54. In the apparatus as shown, twenty-four such magnets are used, consisting of four horizontal rings spaced at equal intervals vertically on the hollow cylinder, each ring containing six electro-magnets. The electro-magnets are energized by batteries 67 placed inside cylinder 54.

One pole of each magnet is inserted and rigidly secured in a hole in the cylinder 54 and the other pole is adjacent the inner surface of cylindrical separator 49. The cylinder 54 with its magnets is mounted on a large gear 55 which in turn rests on a sliding crosshead 56. Interposed between gear 55 and crosshead 56 are ball bearings 57 rolling in suitable grooves cut in each of the two pieces 55 and 56. Crosshead 56 slides in the grooves of the two vertical supports 58 and is moved in these grooves by an eccentric arm 59 on an eccentric wheel 60. The wheel 60 is keyed on shaft 61 of motor 62.

On shaft 61 is a bevel gear 63 which drives a bevel gear 64 on the lower end of vertical shaft 65. On the upper end of vertical shaft 65 is a pinion gear 66 which meshes with gear 55.

These gears and the eccentric wheel will rotate the cylinder 54 about its axis with its electro-magnets 53 and at the same time gives it an oscillatory movement vertically.

Now if ball bearings 12 are placed on the vertical outer surface of cylinder 49 adjacent the pole-face of each magnet they will be retained in that position by the magnetic force. When motor 62 is started the magnets will be rotated about the axis of cylinder 54 and will at the same time be oscillated vertically. The balls 12 will be rolled on the vertical surface following the loci of the outer pole-faces of the electromagnets. This rotation and oscillation of the magnets can be controlled so that the rotation will be very slow and that there will be, say, two complete oscillations per complete rotation. The limits of oscillation can be made equal to the circumference of the ball or any appropriate distance and can be regulated by varying the point of eccentricity on wheel 60. Thus it will be possible to rotate the balls over and over and expose all of their surfaces equally to the electrolytic action.

In electroplating the ball bearings any thickness of the desired metal can be applied, depending on the length of time and the conditions of plating such as current density, electrolyte concentration, etc. As little as 0.0002" may be satisfactory for some applications and 0.002" or more may be advantageous in others. The ball bearings after plating will necessarily have to be repolished. It is possible to lap the composite product to any tolerance of sphericity. If chromium is used a mirror finish can be obtained.

The magnet material employed is dependent on the job. For small balls, permanent magnets of some strongly retentive magnetic alloy could be used. In the case of large spheres electromagnets can be used.

The ball bearings will have residual magnetism after plating in my apparatus and this must be removed. By placing the ball bearings in an alternating magnetic field and gradually decreasing the strength of the field, the residual magnetism will be removed.

My invention is not limited to chromium plating as it is possible to plate spherical ferrous objects with any metal. Also it should be understood that cylindrical objects and spheroids can be plated by this means as effectively as spherical ones. Likewise, my invention should not be limited to spherical objects with cores of ferrous metals as there are other metals which are magnetizable and, therefore, can be treated by this method.

Lastly, my invention should not be restricted to the exact type of apparatus described, but should only be limited by the appended claims.

The invention described herein may be manufactured and/or used by or for the Government of the United States of America for governmental purposes without the payment of any royalties thereon or therefor.

Having thus described my invention, what I claim as new and desire to secure by Letters Patent is:

1. An apparatus for electroplating magnetizable spheroids comprising an electroplating tank, an electrolyte contained in said tank, an anode within said tank, a non-magnetic conducting plate forming a portion of the liquid retaining wall of said tank opposed to said anode and adapted to serve as a cathode contacting surface, a plurality of magnets with at least one pole of each next adjacent to said plate but external of said tank for maintaining electrical and rolling contact between said plate and said spheroids within said tank, and mechanical means for causing relative movement between said plate and said magnets whereby said spheroids are rolled on said plate.

2. An apparatus for electroplating magnetizable spheroids comprising electroplating means, a non-magnetic electrical conducting plate serving as the cathode contacting surface in said electroplating means, magnetic means for maintaining electrical and rolling contact between said plate and said spheroids, and means for moving said magnetic means to cause rolling movement of said spheroids on said plate whereby the surfaces of said spheroids are uniformly exposed to said electroplating means.

3. An apparatus for electroplating a plurality of magnetizable spheroids comprising an electroplating tank, an electrolyte within said tank, an anode immersed in said electrolyte, a non-magnetic conducting cathode contacting plate forming a portion of the wall of said tank opposed to said anode, a space for said spheroids between said anode and said plate, a plurality of magnets with at least one pole-face of each magnet next adjacent to said plate but external to said tank for maintaining electrical and rolling contact between said plate and said spheroids within said tank, and mechanical means for moving said magnets without any movement away from or closer to said plate whereby said spheroids are rolled on said plate.

4. An apparatus for uniformly electroplating the surface of magnetizable bodies capable of rolling movement comprising a vertical non-magnetic conducting plate on which said bodies are supported, a plurality of magnets with at least one pole of each next adjacent to one surface of said plate for retaining said bodies in electrical and rolling contact with the opposite surface of said plate, an electroplating tank of which said plate forms a portion of one liquid retaining wall, an electrolyte in said tank, an anode immersed in said electrolyte opposite said plate, a space between said plate and said anode to accommodate said bodies, mechanical means for moving said magnets with at least one pole-face always next adjacent to said plate external to said tank whereby said bodies are rolled on said plate within said space, and means for passing electrical current through said plate and bodies cathodically whereby said bodies are subjected to electrolytic treatment.

5. An apparatus for uniformly electroplating magnetizable bodies capable of rolling movement comprising electroplating means, magnetic means for controlling rolling movement of said bodies, a non-magnetic conducting means interposed between said bodies and said magnetic means to support said bodies and to serve as the cathode contacting surface within said electroplating means, and means for causing relative movement between said magnetic means and said conducting means whereby said bodies are rotated on said conducting means and are exposed to said electroplating means.

RICHARD M. WICK.